United States Patent
Wang et al.

(10) Patent No.: US 8,447,494 B2
(45) Date of Patent: May 21, 2013

(54) PLUG-IN HYBRID EVAP VALVE MANAGEMENT TO REDUCE VALVE CYCLING

(75) Inventors: Zhong Wang, Bellevue, WA (US); Brian Spohn, Holly, MI (US); Miles K. Maxey, Holly, MI (US); Jonathan J Stec, Milford, MI (US); Timothy E. McCarthy, Grand Blanc, MI (US); Vincent A. White, Northville, MI (US); John F. Van Gilder, Webberville, MI (US); Lan Wang, Troy, MI (US); Jun Lu, Novi, MI (US)

(73) Assignee: GM Global Technology Operations LLC

( * ) Notice: Subject to any disclaimer, the term of this patent is extended or adjusted under 35 U.S.C. 154(b) by 1150 days.

(21) Appl. No.: 12/361,109

(22) Filed: Jan. 28, 2009

(65) Prior Publication Data
US 2009/0216426 A1 Aug. 27, 2009

Related U.S. Application Data

(60) Provisional application No. 61/030,658, filed on Feb. 22, 2008.

(51) Int. Cl.
*G06F 17/00* (2006.01)
*F02M 63/02* (2006.01)
*F02M 33/02* (2006.01)
*F02M 37/00* (2006.01)

(52) U.S. Cl.
USPC .............. 701/103; 123/198 DB; 123/516; 123/520

(58) Field of Classification Search
USPC ................ 701/103; 123/198 DB, 516, 518, 123/519, 520
See application file for complete search history.

(56) References Cited

U.S. PATENT DOCUMENTS

| | | | |
|---|---|---|---|
| 4,032,091 A * | 6/1977 | Reddy | 244/135 R |
| 5,094,206 A * | 3/1992 | Buslepp et al. | 123/325 |
| 6,412,455 B1* | 7/2002 | Ogiso et al. | 123/90.11 |
| 6,966,218 B2* | 11/2005 | Oki et al. | 73/114.39 |
| 7,347,191 B2* | 3/2008 | Atwood et al. | 123/516 |
| 7,418,953 B2* | 9/2008 | Annoura | 123/520 |
| 7,950,375 B2* | 5/2011 | Wang et al. | 123/520 |
| 2009/0277162 A1* | 11/2009 | Cominetti et al. | 60/297 |

* cited by examiner

*Primary Examiner* — Mahmoud Gimie
*Assistant Examiner* — David Hamaoui

(57) ABSTRACT

A control module for an engine of a vehicle includes a mode determination module that determines whether the vehicle is in a fuel-saving mode based on an acceleration of the vehicle. A diurnal control valve (DCV) control module selectively closes a DCV a predetermined time after at least one of determining that the vehicle is in the fuel-saving mode and determining that the engine is stopped.

16 Claims, 3 Drawing Sheets

PLUG-IN HYBRID EVAP VALVE MANAGEMENT TO REDUCE VALVE CYCLING

CROSS-REFERENCE TO RELATED APPLICATIONS

This application claims the benefit of U.S. Provisional Application No. 61/030,658, filed on Feb. 22, 2008. The disclosure of the above application is incorporated herein by reference.

FIELD

The present disclosure relates to vehicle emissions and more particularly to evaporative emissions control.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel (A/F) mixture within cylinders to drive pistons and to provide drive torque. Air is delivered to the cylinders via a throttle and an intake manifold. A fuel injection system supplies fuel from a fuel tank to provide fuel to the cylinders based on a desired A/F mixture. To prevent release of fuel vapor, a vehicle may include an evaporative emissions system which includes a canister that absorbs fuel vapor from the fuel tank, a canister vent valve, and a purge valve. The canister vent valve allows air to flow into the canister. The purge valve supplies a combination of air and vaporized fuel from the canister to the intake system.

Closed-loop control systems adjust inputs of a system based on feedback from outputs of the system. By monitoring the amount of oxygen in the exhaust, closed-loop fuel control systems manage fuel delivery to an engine. Based on an output of oxygen sensors, an engine control module adjusts the fuel delivery to match an ideal A/F ratio (14.7 to 1). By monitoring engine speed variation at idle, closed-loop speed control systems manage engine intake airflows and spark advance.

Typically, the fuel tank stores liquid fuel such as gasoline, diesel, methanol, or other fuels. The liquid fuel may evaporate into fuel vapor which increases pressure within the fuel tank. Evaporation of fuel is caused by energy transferred to the fuel tank via radiation, convection, and/or conduction. A plug-in hybrid evaporative emissions control (EVAP) system is designed to store and dispose of fuel vapor to prevent release. More specifically, the plug-in hybrid EVAP system returns the fuel vapor from the fuel tank to a hybrid engine for combustion therein. The plug-in hybrid EVAP system is a sealed system to meet zero emission requirements. The plug-in hybrid EVAP system is a sealed system intended to meet zero emissions requirements. More specifically, the plug-in hybrid EVAP system my be implemented in a plug-in hybrid vehicle with minimum engine operation that stores fuel vapor prior to being purged to the engine.

The plug-in hybrid EVAP system includes an evaporative emissions canister (EEC), a purge valve, and a diurnal control valve. When the fuel vapor increases within the fuel tank, the fuel vapor flows into the EEC. The purge valve controls the flow of the fuel vapor from the EEC to the intake manifold. The purge valve may be modulated between open and closed positions to adjust the flow of fuel vapor to the intake manifold.

SUMMARY

A control module for an engine of a vehicle includes a mode determination module that determines whether the vehicle is in a fuel-saving mode based on an acceleration of the vehicle. A diurnal control valve (DCV) control module selectively closes a DCV a predetermined time after at least one of determining that the vehicle is in the fuel-saving mode and determining that the engine is stopped.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
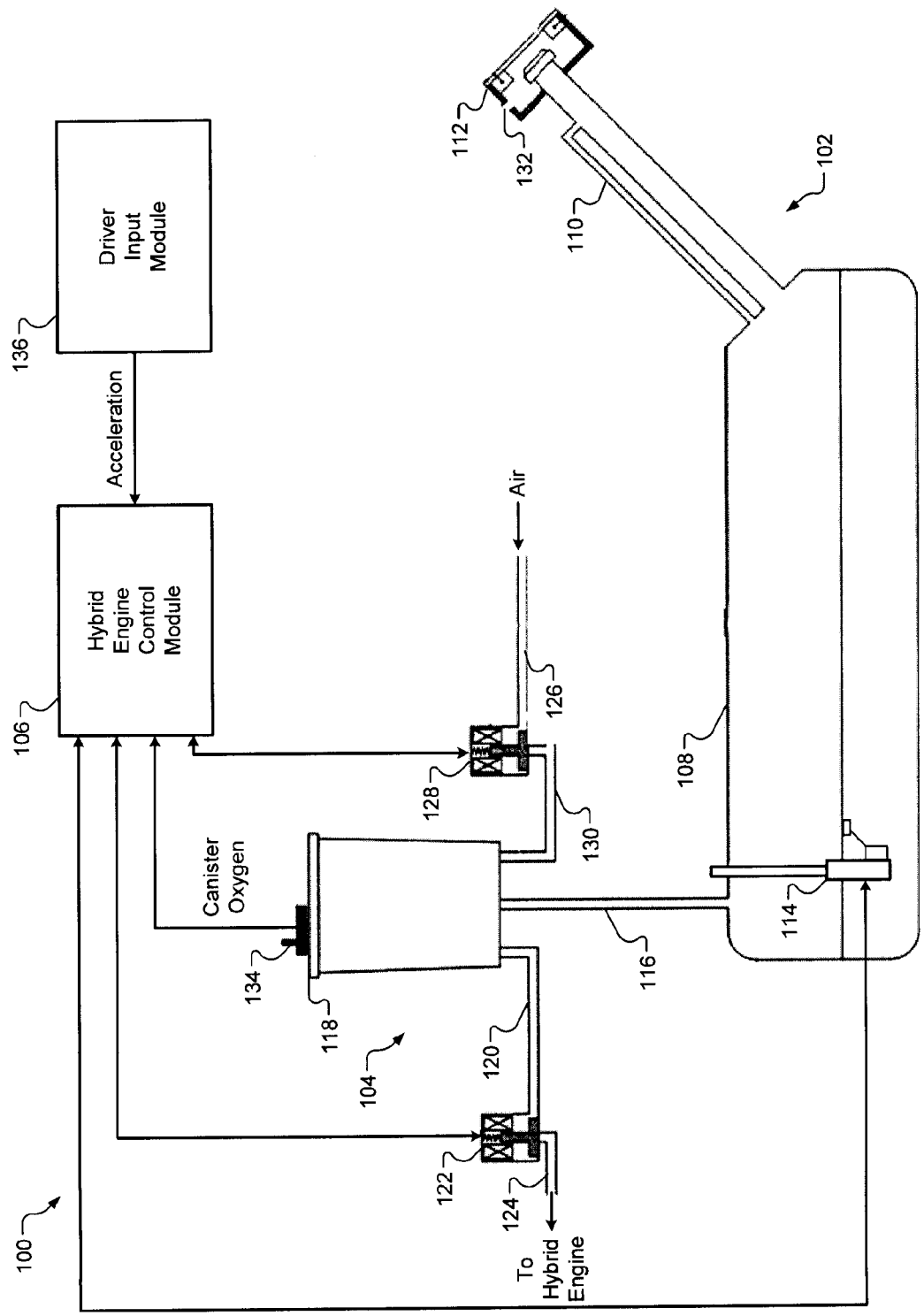
FIG. 1 is a functional block diagram of an exemplary hybrid engine system of a hybrid vehicle according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A diurnal control valve (DCV) controls the flow of air into an evaporative emissions canister (EEC). The diurnal control valve is normally closed to minimize emissions. The diurnal control valve is opened to allow fuel vapor in the EEC to be purged when the hybrid engine is running. A hybrid engine may excessively turn on and off. Consequently, the diurnal control valve may excessively cycle between an open position and a closed position. The excessive cycling may cause the diurnal control valve to suffer unnecessary wear and/or damage.

To reduce cycling of the DCV of a plug-in hybrid evaporative emissions control (EVAP) system, the hybrid engine control system of the present disclosure includes a DCV control system. The DCV control system closes the DCV a predetermined time after the hybrid engine stops running. Alternatively, the DCV control system closes the DCV the predetermined time after a hybrid engine system of the vehicle enters a deceleration fuel cut-off (DFCO) mode. While the operation of the DCV control system will be discussed as it relates to plug-in hybrid vehicles, the principles of the present disclosure are also applicable to any vehicle having an internal combustion engine.

Referring now to FIG. 1, a functional block diagram of an exemplary hybrid engine system 100 of a vehicle is shown. The hybrid engine system 100 includes a fuel system 102, a plug-in hybrid EVAP system 104, and a hybrid engine control module 106. The fuel system 102 includes a fuel tank 108, a fuel inlet 110, a fuel cap 112, and a modular reservoir assembly (MRA) 114. The plug-in hybrid EVAP system 104 includes a fuel vapor line 116, a canister 118, a fuel vapor line 120, a purge valve (PV) 122, a fuel vapor line 124, an air line 126, a DCV 128, and an air line 130.

The fuel tank 108 contains liquid fuel and fuel vapor. The fuel inlet 110 extends from the fuel tank 108 to enable fuel filling. The fuel cap 112 closes the fuel inlet 110 and may include a bleed hole 132. The MRA 114 is disposed within the fuel tank 108 and pumps liquid fuel to a fuel injection system (not shown) of the hybrid engine system 100 to be combusted.

Fuel vapor flows through the fuel vapor line 116 into the canister 118, which stores the fuel vapor. The fuel vapor line 120 connects the canister 118 to the PV 122, which is initially closed in position. The hybrid engine control module 106 controls the PV 122 to selectively enable fuel vapor to flow through the fuel vapor line 124 into the intake system (not shown) of the hybrid engine system 100 to be combusted. Air flows through the air line 126 to the DCV 128, which is initially closed in position. The hybrid engine control module 106 controls the DCV 128 to selectively enable air to flow through the air line 130 into the canister 118.

The hybrid engine control module 106 regulates operation of the hybrid engine system 100 based on various system operating parameters. The hybrid engine control module 106 controls and is in communication with the MRA 114, the PV 122, and the DCV 128. The hybrid engine control module 106 is further in communication with an oxygen sensor 134. The oxygen sensor 134 generates a canister oxygen signal based on an oxygen concentration level of the fuel vapor/air mixture in the canister 118. The hybrid engine control module 106 is further in communication with a driver input module 136 that generates an acceleration signal based on an accelerator pedal position of the vehicle.

Figure 2:
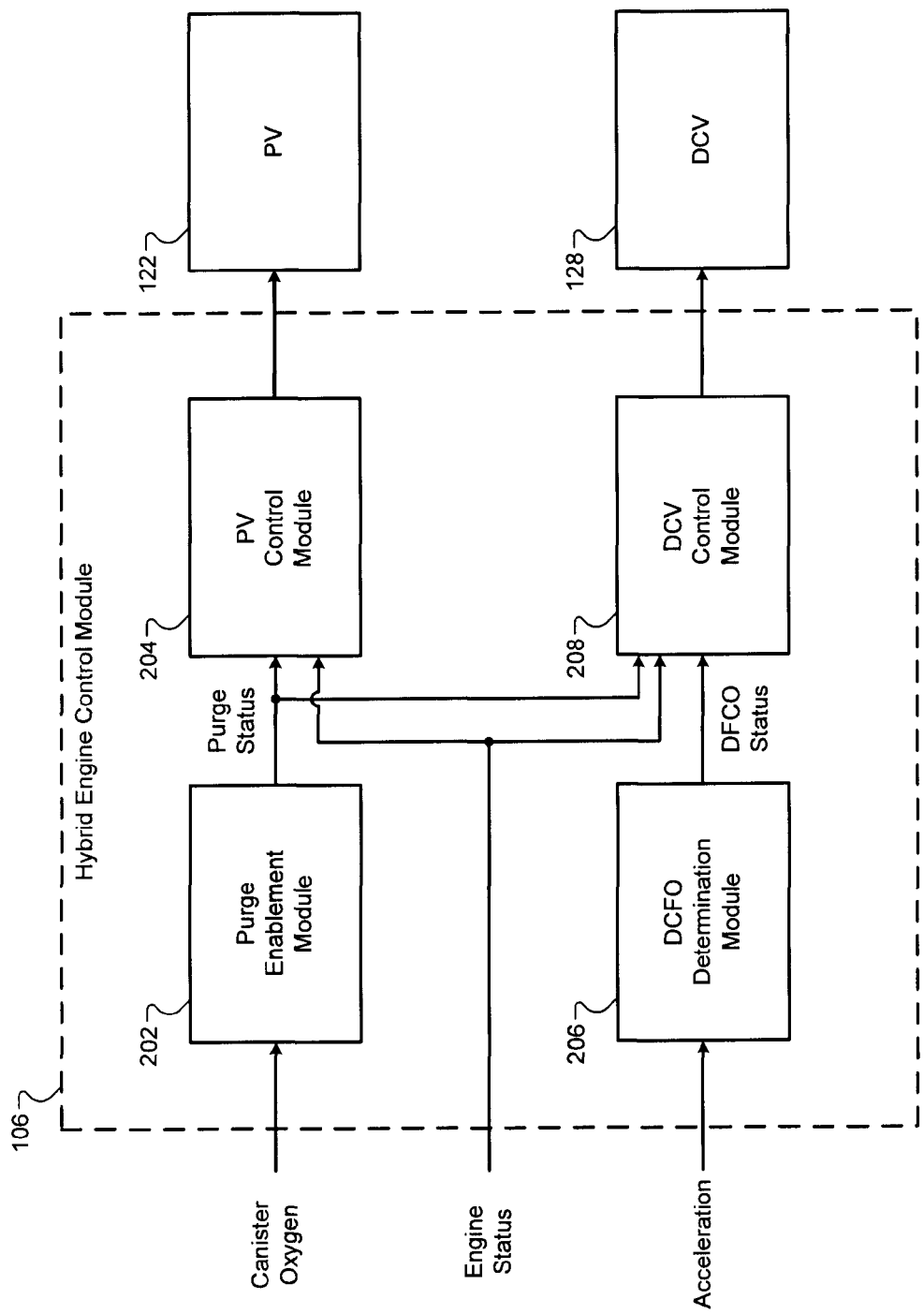
FIG. 2 is a functional block diagram of an exemplary hybrid engine control module according to the principles of the present disclosure.

Referring now to FIG. 2, a functional block diagram of the hybrid engine control module 106 is shown. The hybrid engine control module 106 includes a purge enablement module 202, a PV control module 204, a DFCO determination module 206, and a DCV control module 208. The purge enablement module 202 receives the canister oxygen signal and determines a purge status signal based on the canister oxygen signal.

For example only, the purge status signal may be determined to be an enabled signal when the canister oxygen is greater than or equal to a predetermined value. The purge status signal may be determined to be a disabled signal when the canister oxygen is less than the predetermined value. In addition, the purge enablement module 202 may receive other system operating parameters, such as an oxygen concentration level of exhaust gas of the hybrid engine system 100 and a mass of air flowing into the hybrid engine system 100. The purge enablement module 202 may determine the purge status signal based on the other system operating parameters.

The PV control module 204 receives the purge status signal and an engine status signal from a hybrid engine (not shown) of the hybrid engine system 100. The engine status signal includes an engine on signal when the hybrid engine is running. The engine status signal includes an engine off signal when the hybrid engine is not running. The PV control module 204 opens the PV 122 when the purge status signal includes the enabled signal and the engine status signal includes the engine on signal. The PV control module 204 closes the PV 122 when the purge status signal includes the disabled signal or the engine status signal includes the engine off signal.

The DFCO determination module 206 receives the acceleration signal and determines a DFCO status signal based on the acceleration signal. A DFCO mode is a fuel-saving mode whereby fuel injectors (not shown) of the hybrid engine system 100 are turned off when a throttle (not shown) of the hybrid engine system 100 is closed, and the hybrid engine is driven by the momentum of the vehicle. For example only, the DFCO status signal may be determined to be a DFCO on signal when the acceleration is less than or equal to a predetermined value that indicates that the hybrid engine system 100 is in the DFCO mode. The DFCO status signal may be determined to be a DFCO off signal when the acceleration is greater than the predetermined value. The PV control module 204 closes the PV 122 when the DFCO status signal includes the DFCO on signal.

The DCV control module 208 receives the DFCO status signal, the purge status signal, and the engine status signal. The DCV control module 208 opens the DCV 128 when the purge status signal includes the enabled signal and the engine status signal includes the engine on signal. The DCV control module 208 closes the DCV 128 when the purge status signal includes the disabled signal. The DCV control module 208 closes the DCV 128 after a predetermined time when the engine status signal includes the engine off signal or the DFCO status signal includes the DFCO on signal.

The predetermined time is calibrated based on a temperature of air flowing into the hybrid engine system 100. To minimize cycling of the DCV 128, the predetermined time may be set to a large value, such as 60 seconds. To minimize emission of the fuel vapor, the predetermined time may be set to a small value, such as 10 seconds.

Figure 3:
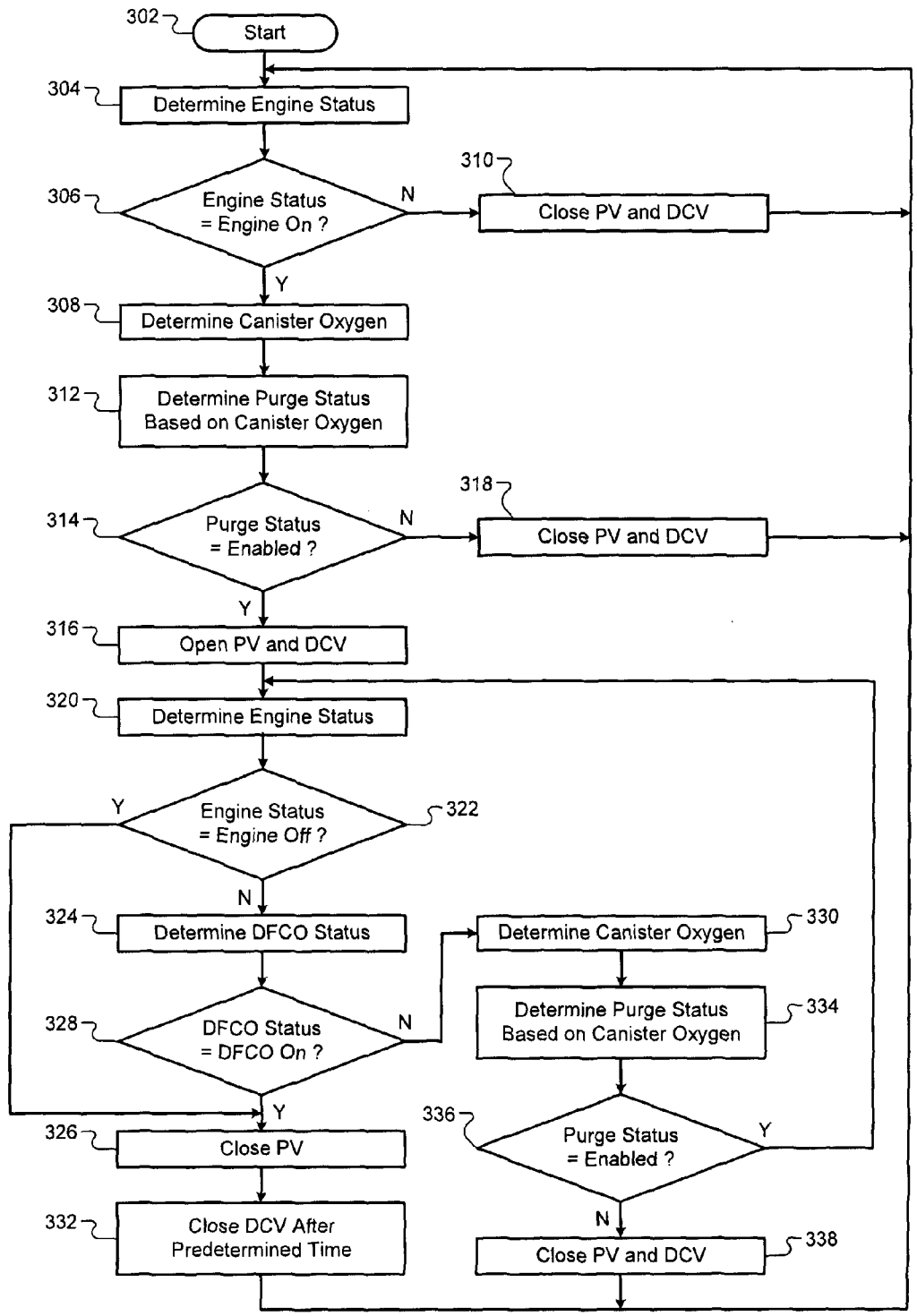
FIG. 3 is a flowchart depicting exemplary steps performed by the hybrid engine control module according to the principles of the present disclosure.

Referring now to FIG. 3, a flowchart depicting exemplary steps performed by the hybrid engine control module 106 is shown. Control begins in step 302. In step 304, the engine status signal is determined. In step 306, control determines whether the engine status signal includes the engine on signal. If true, control continues in step 308. If false, control continues in step 310.

In step 308, the canister oxygen signal is determined. In step 310, the PV 122 and the DCV 128 are closed. Control returns to step 304. In step 312, the purge status signal is determined based on the canister oxygen signal. The purge status signal may be used for the control of other types of emissions.

In step 314, control determines whether the purge status signal includes the enabled signal. If true, control continues, in step 316. If false, control continues in step 318. In step 316, the PV 122 and the DCV 128 are opened.

In step 318, the PV 122 and the DCV 128 are closed. Control returns to step 304. In step 320, the engine status signal is determined. In step 322, control determines whether the engine status signal includes the engine on signal. If false, control continues in step 324. If true, control continues in step 326.

In step 324, the DFCO status signal is determined. In step 328, control determines whether the DFCO status signal includes the DCFO on signal. If true, control continues in step 326. If false, control continues in step 330. In step 326, the PV 122 is closed. In step 332, the DCV 128 is closed after the predetermined time. Control returns to step 304.

In step 330, the canister oxygen signal is determined. In step 334, the purge status signal is determined based on the canister oxygen signal. In step 336, control determines whether the purge status signal includes the enabled signal. If false, control continues in step 338. If true, control returns to step 320. In step 338, the PV 122 and the DCV 128 are closed. Control returns to step 304.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims. For example, while the operation of the DCV control system was discussed as it related to plug-in hybrid vehicles, the principles of the present disclosure are also applicable to any vehicle having an internal combustion engine.

What is claimed is:

1. A control module for a hybrid engine system of a vehicle comprising an engine, the control module comprising:
    a mode determination module that determines whether the vehicle is in a fuel-saving mode based on an acceleration of the vehicle, wherein in the fuel-saving mode one or more fuel injectors of the hybrid engine system are turned off in response to deceleration of the vehicle before the vehicle has stopped; and
    a diurnal control valve (DCV) control module configured to close a DCV a predetermined time after determining that the vehicle is in the fuel-saving mode, and configured to close the DCV a predetermined time after determining that the engine is stopped.

2. The control module of claim 1 wherein the mode determination module determines that the vehicle is in the fuel-saving mode when the acceleration is less than a threshold.

3. The control module of claim 1 wherein the DCV control module receives an engine status and determines whether the engine is stopped based on the engine status.

4. The control module of claim 1 further comprising a purge valve control module that closes a purge valve when the vehicle is in the fuel-saving mode.

5. The control module of claim 4 further comprising a purge enablement module that generates a purge status based on an evaporative emissions canister (EEC) level, wherein the purge valve control module closes the purge valve further based on the EEC level.

6. The control module of claim 1 wherein the DCV control module receives an operating mode, an engine status, and a purge status and selectively closes the DCV based on the operating mode, the engine status, and the purge status.

7. The control module of claim 1 wherein the predetermined time is based on air temperature.

8. A hybrid vehicle that includes the control module of claim 1.

9. A method for operating a hybrid engine system of a vehicle comprising an engine, the method comprising:
    determining whether the vehicle is in a fuel-saving mode based on an acceleration of the vehicle, wherein in the fuel-saving mode one or more fuel injectors of the hybrid engine system are turned off in response to deceleration of the vehicle before the vehicle has stopped; and
    if it is determined that the vehicle is in the fuel-saving mode, selectively closing a diurnal control valve (DCV) a predetermined time after determining that the vehicle is in the fuel-saving mode, and if it is determined that the engine is stopped, selectively closing the DCV a predetermined time after determining that the engine is stopped.

10. The method of claim 9 further comprising determining that the vehicle is in the fuel-saving mode when the acceleration is less than a threshold.

11. The method of claim 9 further comprising:
    receiving an engine status; and
    determining whether the engine is stopped based on the engine status.

12. The method of claim 9 further comprising closing a purge valve when the vehicle is in the fuel-saving mode.

13. The method of claim 12 further comprising:
    generating a purge status based on an evaporative emissions canister (EEC) level; and
    closing the purge valve further based on the EEC level.

14. The method of claim 9 further comprising:
    receiving an operating mode that indicates the fuel-savings mode, an engine status, and a purge status; and
    selectively closing the DCV based on the operating mode, the engine status, and the purge status.

15. The method of claim 9 wherein the predetermined time is based on air temperature.

16. The method of claim 9 further comprising providing a hybrid vehicle that includes engine.

* * * * *